United States Patent [19]

Dunlap

[11] Patent Number: 5,401,076

[45] Date of Patent: Mar. 28, 1995

[54] DETACHABLE CHILD'S SEAT FOR A WHEELCHAIR

[76] Inventor: Kimberly C. Dunlap, Rte. 4, Box 345, Decatur, Tex. 76234

[21] Appl. No.: 11,746

[22] Filed: Feb. 1, 1993

[51] Int. Cl.⁶ .............................................. A47C 15/00
[52] U.S. Cl. .................................. 297/243; 297/254; 297/310; 297/DIG. 4
[58] Field of Search ............... 297/254, 232, 243, 310, 297/DIG. 4; 280/304.1

[56] References Cited

U.S. PATENT DOCUMENTS

| | | |
|---|---|---|
| 1,217,950 | 3/1917 | Johnston . |
| 1,302,444 | 4/1919 | Silvarman . |
| 1,372,538 | 3/1921 | Olson . |
| 2,517,785 | 8/1950 | Goldstein . |
| 2,530,900 | 11/1950 | Nelson, Jr. ........................ 297/254 |
| 2,560,458 | 7/1951 | Long et al. . |
| 2,769,482 | 11/1956 | Carlson . |
| 2,993,702 | 7/1961 | Gill . |
| 3,245,717 | 4/1966 | Levy .................................. 297/254 |
| 3,318,615 | 5/1967 | Chreist . |
| 3,619,003 | 11/1971 | Rich, Jr. ............................. 297/243 |
| 3,865,427 | 2/1975 | Delany ...................... 297/DIG. 4 X |
| 3,873,127 | 8/1975 | McNichol, Jr. et al. ........... 280/202 |
| 3,998,490 | 12/1976 | Lallave .............................. 297/243 |
| 4,051,985 | 10/1977 | Berger ........................... 297/243 X |
| 4,158,428 | 6/1979 | Bates ........................... 224/42.42 A |
| 4,288,124 | 9/1981 | Hamilton .......................... 297/217 |
| 4,449,750 | 5/1984 | Pultman .................... 297/DIG. 4 X |
| 4,592,592 | 6/1986 | Peek ........................... 297/243 X |
| 4,657,269 | 4/1987 | Elvin ............................. 280/47.38 |
| 4,700,988 | 10/1987 | Meyers .............................. 297/254 |
| 4,711,489 | 12/1987 | Krause .............................. 297/243 |
| 4,779,883 | 10/1988 | Paduano et al. .................... 280/289 |
| 4,902,029 | 2/1990 | Gain et al. ....................... 280/304.1 |
| 5,127,709 | 7/1992 | Rubinstein et al. ....... 297/DIG. 4 X |

FOREIGN PATENT DOCUMENTS 0157989  2/1957  Sweden ............................. 297/254

OTHER PUBLICATIONS

Lakeshore Learning Materials Catalog 1992, p. 62; 2695 E. Dominguez St., Carson, Calif. 90749.

Primary Examiner—Kenneth J. Dorner
Assistant Examiner—Milton Nelson, Jr.
Attorney, Agent, or Firm—Charles E. Dunlap

[57] ABSTRACT

In combination with a wheelchair having rigid frame members, a detachable child's seat which includes a seat portion, a frame of rigid members attached to and supporting the seat portion, and devices for selectively attaching and detaching the child's seat to the frame members of the wheelchair. The child's seat may be constructed with armrests, a seatback, a footrest, a seat belt and anti-tipping struts. The child's seat mounts on a wheelchair in a position which provides the occupant of the wheelchair with an unimpeded field of view.

2 Claims, 2 Drawing Sheets

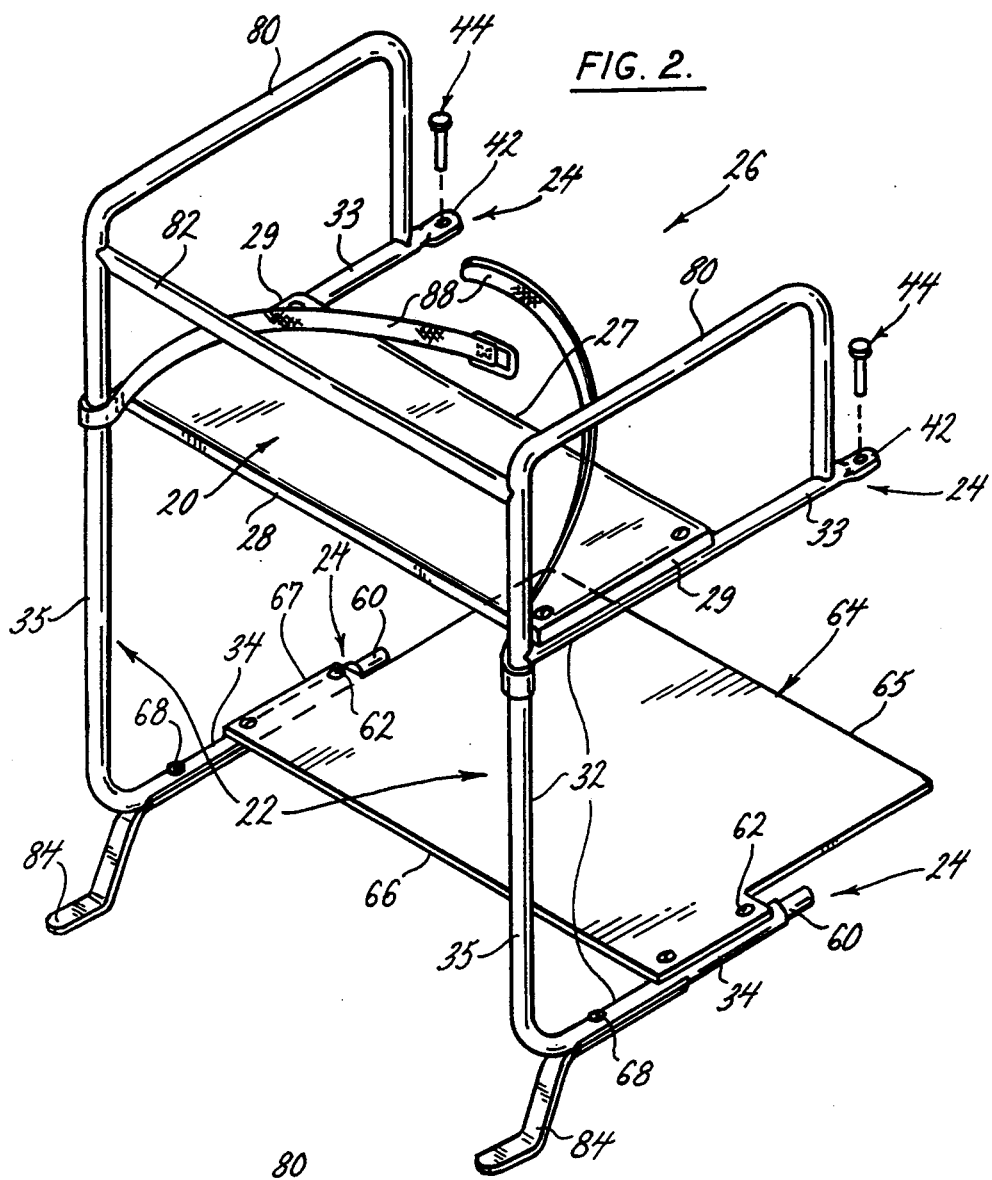
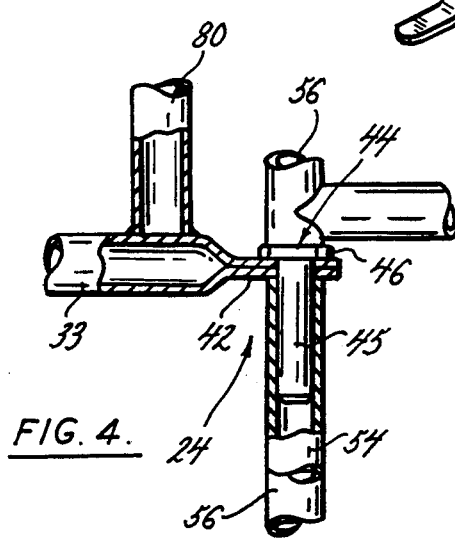
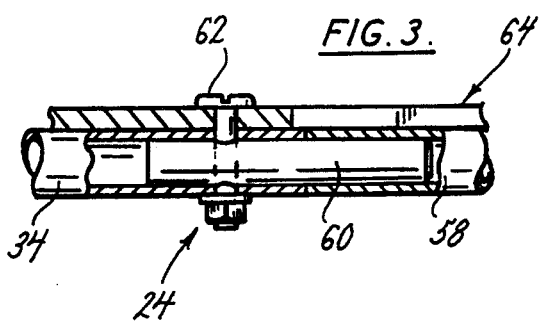

DETACHABLE CHILD'S SEAT FOR A WHEELCHAIR

TECHNICAL FIELD

The present invention relates generally to a detachable seat used to carry children. More particularly, the invention relates to a detachable seat to carry children when the seat is attached to the back of a wheelchair.

BACKGROUND OF THE INVENTION

Many persons who are disabled obtain necessary mobility by using a wheelchair. Often the disabled person is elderly, a child, or otherwise unable to propel and guide the wheelchair without aid. In these instances another person usually pushes and guides the wheelchair. The attendant who pushes the wheelchair usually needs both hands to accomplish the task and must pay close attention to the speed and direction of the wheelchair to insure safe operation. In many cases the attendant must also care for a child in addition to the occupant of the wheelchair. If the child can not walk independently, the attendant finds it inconvenient, if not impossible, to manage the transportation of both the child and the wheelchair occupant. This often occurs where a parent of two children, one of whom requires a wheelchair, must take the other child along. In this instance the attendant would like to be able to transport both children in a manner which is safe and which minimizes interaction between the children.

Devices are disclosed in the prior art which have the purpose of providing auxiliary seats for wheelchairs. Examples are U.S. Pat. Nos. 4,779,883 and 4,711,489. Other devices are disclosed which have the purpose of providing auxiliary seats for strollers, U.S. Pat. Nos. 4,657,269 and 3,998,490, or for bicycles, U.S. Pat. No. 3,873,127. While these devices are suitable for the uses for which they are intended, each of them has limitations which make it unsuitable or impossible to use as an auxiliary child's seat for a wheelchair when it is desirable to mount the auxiliary seat in a position which minimizes the inconvenience to the wheelchair occupant and also minimizes the interaction between the wheelchair occupant and the occupant of the child's seat. The prior art devices also do not teach how a detachable child's seat may be provided for a wheelchair to safely and comfortably carry a child larger than an infant. In addition, the prior art devices can not be installed or removed from the wheelchair without the use of tools, thus adding the inconvenience of obtaining the proper tools whenever one wishes to install or remove the seat.

SUMMARY OF THE INVENTION

A. Objects of the Invention

It is an advantage of the present invention to provide a detachable child's seat which can be mounted on a conventional wheelchair and which can carry young children while minimizing the inconvenience to the wheelchair occupant.

Another advantage of the present invention is to provide a detachable child's seat for a wheelchair which is suitable for safely carrying children larger than infants.

Another advantage of the present invention is to provide a detachable child's seat for a wheelchair which does not obstruct the vision or movement of the wheelchair occupant.

Another advantage of the present invention is to provide a detachable child's seat for a wheelchair which is attachable to the back of the chair and minimizes interaction between the occupant of the wheelchair and the child in the seat.

An additional advantage of the present invention is to provide a detachable seat for a wheelchair which is easily and quickly attached to or detached from the wheelchair without the use of any tools.

An additional advantage of the present invention is to provide a detachable seat for a wheelchair which is safe, durable and easily manufactured, and is convenient for the occupant of the wheelchair, the child in the seat and the attendant, if any, who is pushing the wheelchair.

The detachable child's seat for a wheelchair of the present invention has other objects and features of advantage which are described in more detail in and will become apparent from the accompanying drawing and the description of the preferred embodiment.

B. Summary of the Invention

The detachable child's seat for a wheelchair of the present invention is comprised, briefly, of a seat portion, frame means connected to the seat portion and formed for supporting the seat portion and holding it in a constant position with respect to the wheelchair when the detachable child's seat is mounted on the back of a wheelchair, and mounting means secured to at least one of the outer ends of the frame means and formed for cooperative engagement with the wheelchair frame and for attachment of the child's seat to the wheelchair frame in a secure manner. The mounting means are further formed to provide a method of attachment and detachment of the child's seat to and from the wheelchair without the use of tools. The detachable child's seat may also be provided with armrest, seatback, footrest and restraint means and with anti-tipping strut means.

BRIEF DESCRIPTION OF THE DRAWINGS

FIG. 2 is a top perspective view of the detachable child's seat of the present invention.

FIG. 3 is an enlarged, fragmentary side view of the mounting means of the upper segment of the frame.

FIG. 4 is an enlarged, fragmentary side view of the mounting means of the lower segment of the frame.

BEST MODE FOR CARRYING OUT THE INVENTION

The detachable child's seat for a wheelchair 26 of the present invention is generally depicted in FIG. 2. The child's seat 26 is formed for mounting on a wheelchair 50 in a position which places the child in the seat behind the wheelchair and behind the wheelchair occupant, but facing in the same direction as the wheelchair occupant. The seat 26 is shown mounted on a wheelchair 50 in FIG. 1.

Figure 1:
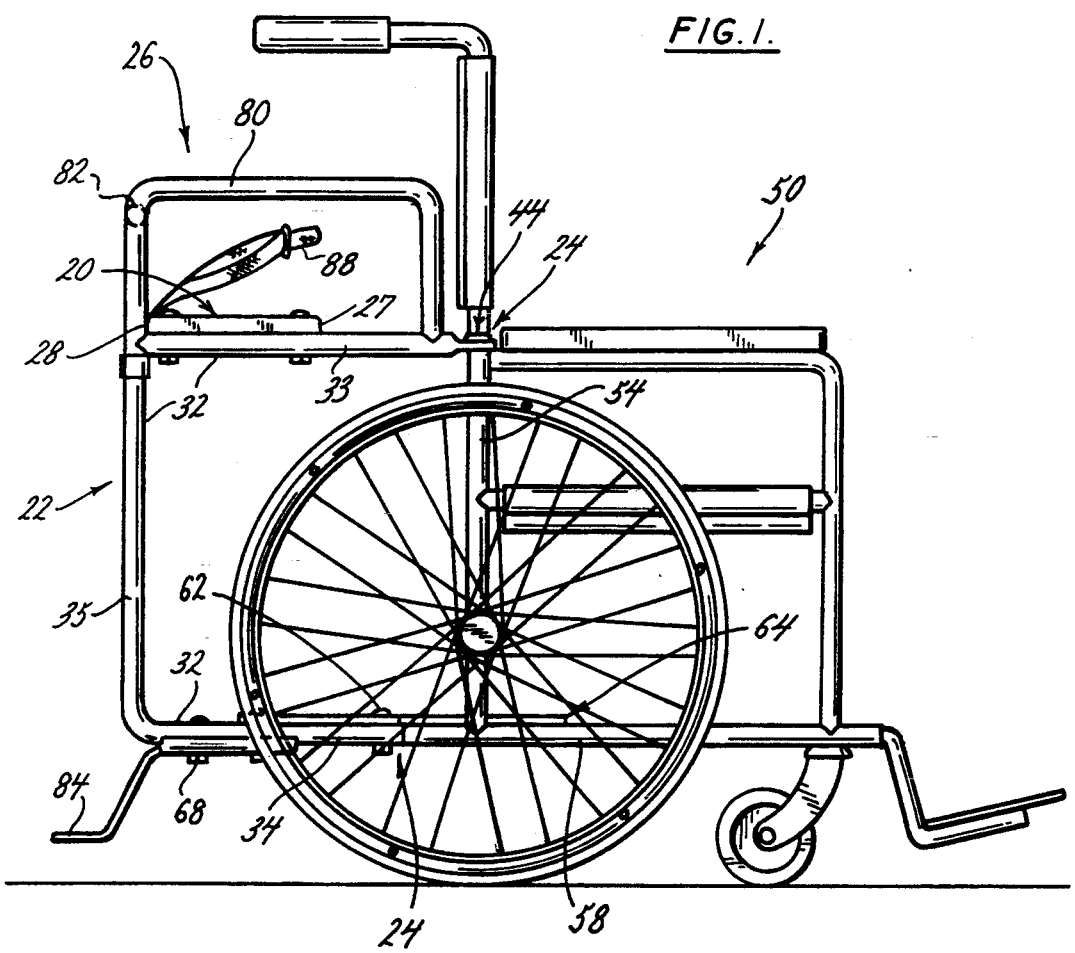
FIG. 1 is a side elevational view of a wheelchair with a detachable child's seat of the present invention mounted on the back of a wheelchair in position for use.
Figure 5:
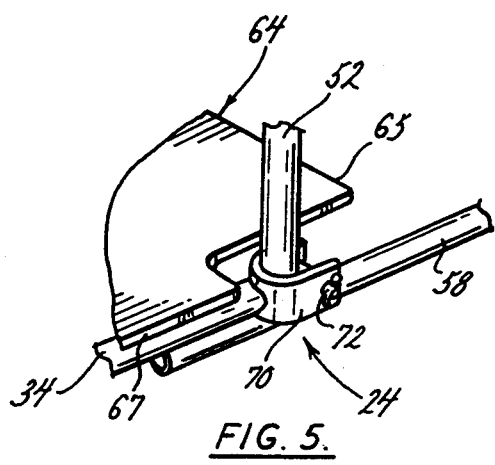
FIG. 5 is an enlarged, fragmentary perspective view of one alternative type of mounting means for attaching the child's seat of the present invention to a wheelchair frame.

A normal wheelchair 50 may have either one or two vertical wheelchair frame members on each side of the wheelchair. The vertical frame members are typically cylindrical metal tubing having an inside and an outside diameter. The vertical frame members typically provide support for the backrest of the wheelchair, the rear of the wheelchair seat and the axle of the main wheels of the wheelchair. In the case of wheelchairs with a single vertical frame member, such member will be designated as 52, while in wheelchairs with two vertical frame members, the two members will be designated as the vertical outer 54 and vertical inner 56 wheelchair frame member as shown in FIG. 4. In a wheelchair with either one or two vertical wheelchair frame members on each side, the bottom end of one vertical wheelchair frame member is normally welded to a horizontal wheelchair frame member 58 (as shown in FIGS. 1 and 5). In a wheelchair with two vertical wheelchair frame members the vertical outer wheelchair frame member 54 normally does not extend the entire height of the wheelchair, but usually extends upward from the horizontal wheelchair frame member 58 and usually terminates at a position near the wheelchair armrest as shown in FIG. 4.

The child's seat 26 is basically formed with a seat portion, generally designated 20, (shown in FIGS. 1 and 2), frame means 22, as shown in FIGS. 1 and 2, which are attached to and support the seat portion 20, and mounting means 24, shown in FIGS. 1-5, which are secured to at least one outer end of the frame means 22 and formed for attachment to the wheelchair frame to provide secure mounting of the child's seat 26 to the wheelchair The seat portion 20 of the child's seat 26 is preferably formed from a rectangular piece of rigid material having a front edge 27, a back edge 28 and two parallel lateral edges 29. The material comprising the seat portion is preferably wood or plastic but is more preferably steel or aluminum. The seat portion 20 may be padded for comfort if desired. The seat portion 20 is attached to the frame means 22 at each of the seat portion's two lateral edges 29 by screws, bolts or welding, as shown in FIGS. 1 and 2. One purpose of the seat portion 20 is to support the weight of the child occupant of the seat. Another purpose of the seat portion 20 is to connect and provide structural stability to the frame means 22.

The frame means 22 is preferably formed as a pair of "C"-shaped frame members 32 each having a upper segment a lower segment 34, and a center segment 35, as shown in FIGS. 1 and 2. The upper segment 33 and lower segment 34 each have outer ends and are horizontal while the center segment 35 is in a vertical position when the seat 26 is mounted on the wheelchair 50. The frame members 32 are preferably parallel and are spaced laterally apart the same distance as the width of the seat portion 20. The lateral edges of the seat portion 29 are preferably attached to each upper segment 33 at a position on the upper segment 33 nearest the center segment 35 so that the seat portion 20 is oriented to provide a suitable seating area as shown in FIGS. 1 and 2. This location of the seat portion 20 provides a space between the front edge of the seat portion 27 and the back of the wheelchair 50 suitable to accommodate the seated child's legs when the child's seat 26 is mounted on the wheelchair 50 as shown in FIG. 1. The frame members 32 are preferably steel, or more preferably aluminum tubing of cylindrical cross-section and of an outside diameter between ¾ inches and 1 inch. The upper segment 33, center segment 35 and lower segment 34 of each frame member 32 are preferably formed by bending the tubing at approximately 90 degrees as shown in FIGS. 1 and 2. However, the segments may also be formed by welding, or otherwise rigidly joining, separate pieces of tubing. (not shown) Other forms of structural material such as metal bars, flat stock or square tubing are also suitable for forming the frame members 32. (not shown) Also, other forms of frame means are suitable for use in this invention. The frame means for example, may be formed of rigid sheets of material (not shown) or by molded plastic components (not shown). Also, the frame means and the seat portion could be molded as a contiguous unit from plastic (also not shown).

It is an important feature of the frame means 22 that it provide support for the seat portion 20 sufficient to hold the seat portion and the child occupant in a constant position in relation to the wheelchair 50 (as shown in FIG. 1) as the wheelchair is being moved about. It is also an important feature that the frame means 22 be sufficiently rigid to prevent the child's seat 26 from shifting or collapsing when the child in the seat is larger than an infant.

Since both the wheelchair and the detachable child's seat of the present invention have frames, in order to prevent misunderstanding the two frames will be distinguished herein by using the term "wheelchair frame" whenever any frame member of the wheelchair is referred to and "frame" whenever any member of the frame of the child's seat is referred to.

In order to mount the child's seat 26 on the wheelchair 50 for carrying of the child's seat by the wheelchair, the child's seat of the present invention further includes mounting means, generally designated 24, secured to at least one of the frame members 32 and formed for cooperative engagement with the wheelchair frame members. Mounting means for a wheelchair with two vertical wheelchair frame members 54, 56 on each side is preferably formed as a flattened section 42 on the outer end of the upper segment 33 as shown in FIG. 4, each flattened section 42 having a hole of a first diameter bored through it. This first diameter is preferably slightly smaller than the internal diameter of the vertical outer member 54 of the wheelchair frame. A pin 44 having a shank 45 of diameter slightly smaller than the first diameter and a head 46 of diameter larger than the first diameter is formed to permit manual insertion through the hole in the flattened section 42 and then passing into the open end of the outer vertical member 54 of the wheelchair frame, as shown in FIG. 4, to provide attachment between the frame 22 and the wheelchair 50. Said preferable mounting means further includes a cylinder 60 of rigid and durable material, preferably steel or aluminum, partially inserted into the outer end of the lower segment 34. The cylinder is secured to the lower segment 34 by a bolt 62 (as shown in FIG. 3), or a screw, by welding, or by a press fit (each not shown). The outside diameter of that part of the cylinder 60 that protrudes from the outer end of the lower segment 34 is slightly smaller than the inside diameter of the horizontal wheelchair frame member 58. The frame members 32 are preferably formed so that the longitudinal axis of the lower segment 34 of each frame member 32 aligns with the longitudinal axis of one horizontal wheelchair frame member 58 when the mounting means 24 is engaged for the upper segment 33 as shown in FIG. 4. The cylinder 60 is inserted into the open end of the horizontal wheelchair frame member 58 to form an attachment between the child's seat and the wheelchair frame as shown in FIG. 3. Alternatively, the cylinder 60 could be secured in the open end of the horizontal wheelchair frame member 58 and inserted into the outer end of the lower segment 34 to form the attachment.

For attaching the child's seat 26 to a wheelchair 50 which has a single vertical wheelchair frame member 52 on each side, the mounting means 24 is preferably formed by a "U"-shaped clevis 70 welded to the outer ends of the upper segment 33 and lower segment 34. The clevis 70 is shown mounted on the lower segment 34 in FIG. 5. The clevis 70 is formed so that when the frame members 32 of the child's seat 26 are brought in contact with the vertical wheelchair frame members 52 said vertical wheelchair frame members 52 are seated into the clevis 70 as shown in FIG. 5. A clevis pin 72 is preferably provided which may be installed or removed by hand to selectively secure the attachment of the frame members 32 to the wheelchair frame in a manner shown in FIG. 5.

An important feature of the mounting means 24 is to provide a method to securely attach the child's seat of the present invention to the back of a wheelchair in a position which places the occupant of the child's seat behind, and out of the path of vision, of the occupant of the wheelchair. In such a position the child will not interfere with the vision or activities of the wheelchair occupant and the child will be in a position easily reachable by the wheelchair attendant.

Another important feature of the mounting means 24 is to provide a method to securely attach the child's seat of the present invention to a wheelchair without the use of tools.

Although the mounting means 24 described above are preferable to provide the advantages of the present invention, it will be understood that other mounting means may be used to attach the child's seat 26 to a wheelchair 50 while remaining within the scope of the present invention.

It is further preferable that the child's seat be provided with armrest means 80, as shown in FIGS. 1 and 2. Said armrest means 80 is preferably formed from a "C"-shaped section of the same tubing as used for the frame members 32 The armrest means 80 is preferably welded to the frame member 32 in a position to provide suitable arm support to a child seated on the seat portion 20 of the child's seat 26. Preferably, one armrest means 80 is provided on each side of the seat portion 20 to extend in a direction parallel to the lateral edges 29 of the seat portion 20. The armrest means 80 may also be formed from an "L"-shaped section of tubing which is welded at one end to a frame member 32 and positioned so that the leg of the "L" which is not welded to the frame member forms an appropriate armrest for the child (not shown). The armrest may be padded for comfort if desired.

It is additionally preferable that the child's seat 26 be formed to provide a seatback means 82, as shown in FIG. 2. Said seatback means 82 is preferably formed by welding each end of a section of the same tubing as used for the frame members 32 to the armrest means 80 at a position which provides back support to a child seated on the seat portion 20. The length of the seatback means 82 is roughly the same as the width of the seat portion 20. The seatback means 82 may be formed from other types and shapes of material and may be padded for comfort if desired. The seatback means 82 may alternatively be attached to and supported by the frame members 32.

It is an important feature of the seatback means 82 that it provides a means for safely retaining the child in the child's seat 26. It is also an important feature of the seatback means 82 that it provides separation between the frame members 32 and structural rigidity to the frame means 22.

It is further preferable that the child's seat 26 be formed to provide footrest means, designated generally as 64, as shown in FIGS. 1 and 2. The footrest means 64 is preferably provided by a flat panel of rigid and durable material, more preferably by a plate of steel or aluminum, and even more preferably by a panel of steel or aluminum rigid mesh (not shown), which has a front edge 65, a back edge 66, and two lateral edges 67. To mount the footrest means 64 on the child's seat 26, each of the footrest means lateral edges 67 is preferably secured to each lower segment 34 by bolts 68, as shown in FIGS. 1 and 2. Alternatively, the footrest means 64 may be secured to the lower segments 34 by screws or by welding (not shown). Each footrest means lateral edge 67 is formed to permit clearance between the footrest means 64 and the vertical members of the wheelchair frame 52, 56 when the child's seat 26 is mounted on the wheelchair 50. Such clearance is preferably provided by forming the footrest means 64 in the manner shown in FIG. 2, with a front edge 65 narrower than the rear edge 66. The width of the front edge 65 being less than the distance between the vertical wheelchair frame members 52, 56.

The footrest means 64 may also be provided with side panels (not shown) formed to extend the length of each footrest means lateral edge 67 and to extend vertically for a distance sufficient to prevent the feet of the child in the child's seat 26 from contacting the spokes of the main wheels of the wheelchair 50. Said side panels may be formed integrally with the footrest means 64 by bending the lateral edges of the footrest panel upwards so as to form side panels which extend upwards from the general plane of the footrest panel at approximately 90 degrees.

It is an important purpose of the footrest means 64 to provide support for the feet of the child in the child's seat 26. It is also an important purpose of the footrest means 64 to provide separation between the frame members 32 and improved rigidity for the frame means 22.

It is additionally preferable that the child's seat of the present invention be provided with an anti-tipping strut (strut) 84 as shown in FIGS. 1 and 2. The strut 84 is preferably formed from a rigid member which is attached to one frame member 32 in a position as shown in FIGS. 1 and 2. The strut 84 extends downwards and rearward from the frame member 32 but does not contact the ground while the wheelchair 50 is in its normal operating position. The strut 84 is formed to contact the ground whenever the wheelchair 50 tips backward and in that manner serves to arrest the tipping movement of the wheelchair 50. The strut is preferably made of steel or aluminum and is preferably attached to the frame member 32 by bolts 68 which extend through both the strut 84 and the frame member 32. Alternatively, the strut 84 may be welded to the frame member 32. A wheel (not shown) may be provided at the end of the strut if desired.

It is further preferable that the child's seat 26 be formed to provide a child restraint device such as a safety belt 88, as shown in FIGS. 1 and 2, to prevent the child from sliding from or otherwise moving from the child's seat 26.

The detachable child's seat for a wheelchair of the present invention may be mounted on powered or unpowered wheelchairs and should be formed of sturdy, lightweight materials typically employed in the construction of wheelchairs. The strength and rigidity of the child's seat enhance its use for children larger than infants, and the light weight and simple mounting means enhance its installation on and removal from a wheelchair.

Having thereby described the subject matter of this invention, it should be obvious that many substitutions, modifications and variations of the invention are possible in light of the above teachings. It is therefore to be understood that the invention as taught and described herein is only to be limited to the extent of the breadth and scope of the appended claims.

What is claimed is:

1. In combination with a wheelchair having a back, a wheelchair seat and rigid frame members, a detachable child's seat comprising a seat portion having a front edge, a back edge, and two opposite lateral edges, two laterally spaced, "C"-shaped frame members, wherein each frame member includes a vertical center segment, subtended at its top by a horizontal upper segment and at its bottom by a horizontal lower segment, each of said horizontal segments having an outer end, which horizontal upper segment and horizontal lower segment extend between said outer ends and said center segment, and where each horizontal upper segment is fixed relative to and supports one lateral edge of said seat portion, said "C"-shaped frame members formed to support said seat portion in a fixed position relative to the wheelchair when said frame members are mounted on the back of the wheelchair, mounting means associated with said horizontal upper segment outer end for releasably retaining said rigid wheelchair frame member, mounting means associated with said horizontal lower segment outer end formed to provide support by removably engaging said rigid wheelchair frame member below said mounting means associated with said horizontal upper segment, armrest means attached to said frame members and extending along and above each lateral edge of said seat portion, seatback means fixed in position along and above the back edge of said seat portion, and footrest means extending between and secured to said lower segments.

2. In combination with a wheelchair having a back, a wheelchair seat and rigid frame members, a detachable child's seat as defined in claim 1 wherein said child's seat is mountable on the back of the wheelchair in position so as to face the same direction as the wheelchair's seat.

* * * * *